Aug. 1, 1972　　MASAO MATSUI ET AL　　3,681,189
MULTILAYER SYNTHETIC FILAMENT
Filed July 23, 1970　　　　　　　　　　　　7 Sheets-Sheet 1
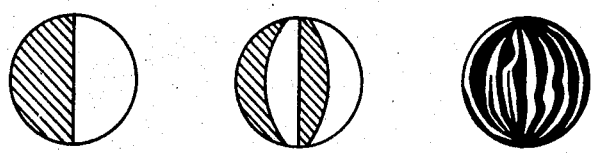
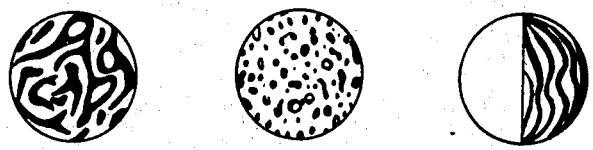
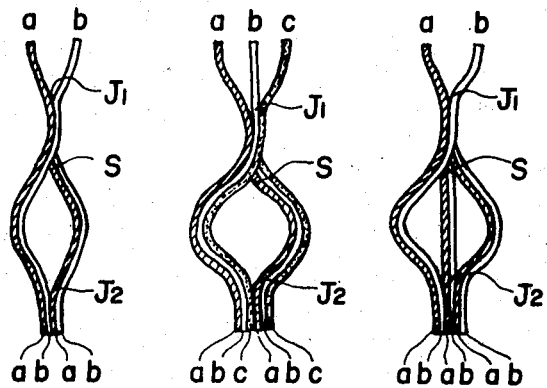
INVENTORS
MASAO MATSUI
SUSUMU TOKURA
MASAHIRO YAMABE
BY *Woodhams, Blanchard & Flynn*
ATTORNEYS

INVENTORS
MASAO MATSUI
SUSUMU TOKURA
MASAHIRO YAMABE

BY Woodhams, Blanchard & Flynn
ATTORNEYS

3,681,189
MULTILAYER SYNTHETIC FILAMENT
Masao Matsui, Susumu Tokura, and Masahiro Yamabe, Osaka, Japan, assignors to Kanegafuchi Boseki Kabushiki Kaisha, Tokyo, Japan
Filed July 23, 1970, Ser. No. 57,522
Claims priority, application Japan, July 31, 1969, 44/60,896
Int. Cl. D01d 5/28
U.S. Cl. 161—175     20 Claims

ABSTRACT OF THE DISCLOSURE

Synthetic filament having a multilayer configuration, in which polyamide and/or polyester excluding polypivalolactone and polypivalolactone are layer-multiplied in the form of a grainy, archipelagic or nebulous configuration at the cross-section of the unitary filament, is manufactured by subjecting said spinning materials to at least 3 times of "joining-dividing in different phase" repeatedly and then extruding the layer-multiplied spinning materials from orifice on a spinneret. The synthetic filament is excellent in the elastic property and antistatic property.

---

Figure 13:
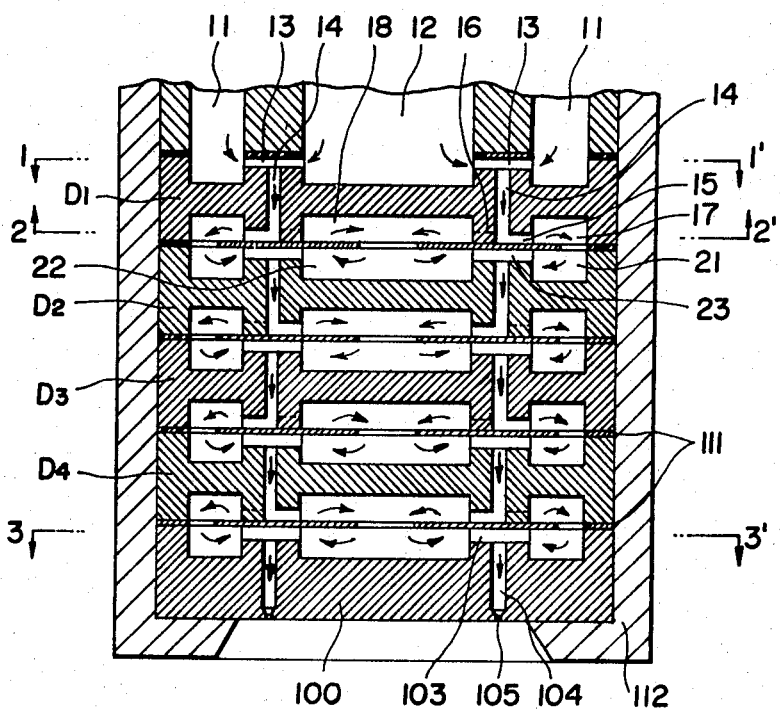

The present invention relates to a synthetic filament having a mixed configuration composed of at least two components and a method of producing the synthetic filament.

Polyamide and polyester synthetic filaments are commercially produced at present on a large scale, but they still have various drawbacks. One of the drawbacks is their poor elastic property. That is, polyamide and polyester filaments are poor in their recovery from elongation. Particularly, polyester filaments, such as polyethylene terephthalate and the like, are remarkably poor in their recovery from elongation. Moreover, polyester filament is low in energy elasticity. Such poor recovery from elongation and low energy elasticity are not suitable for cloths. For example, knitted goods prepared from polyester filaments are poor in stretchability and are apt to be crumpled, so that the knitted goods are poor in fitting ability. Similarly, these drawbacks are undesirable for industrial materials, for example, tire cord, and they generate heat in tires during running and cause flat spotting of tires.

Various attempts have hitherto been made in order to improve the properties of filaments by mix spinning at least two components. However, in the conventional polyamide mixed filament or polyester mixed filament, the elasticity (recovery from elongation) is not improved, but the tensile strength and the recovery from elongation are often lowered. The object of the present invention is to provide a novel polyamide and/or polyester mixed filament in which these drawbacks are minimized, and a method for producing the mixed filament.

The synthetic filament according to the present invention has a multilayer configuration, in which (1) polyamide and/or polyester (excluding polypivalolactone) and (2) polypivalolactone are layer-multiplied at least in a part of the cross-section of the unitary filament.

The method of producing the synthetic filament according to the present invention consists in subjecting separately melted (1) polyamide and/or polyester (excluding polypivalolactone) and (2) polypivalolactone to at least 3 times of joining-dividing in different phases repeatedly to layer-multiply the spinning materials, and then extruding the resulting layer-multiplied spinning materials.

Another method of producing the synthetic filament according to the present invention consists in subjecting separately melted (1) polyamide and/or polyester (excluding polypivalolactone) and (2) polypivalolactone to at least 3 times of joining-dividing in different phase repeatedly to layer-multiply the spinning materials, and bonding and extruding the layer-multiplied spinning materials and another spinning material.

The first aspect of the synthetic filament according to the present invention lies in that polypivalolactone is used as one component in the mix spinning operation. Polypivalolactone has a peculiar elastic property or a latent elasticity. However, polypivalolactone generally crystallizes extremely faster than conventional thermoplastic synthetic polymers and has high crystallinity, and it is difficult to obtain filaments having an improved property by melt spinning, etc. For example, filaments produced from polypivalolactone by melt spinning have a high crystallinity in the undrawn state, and sufficient drawing is often difficult. Accordingly, it has hitherto been very difficult to produce filaments having a high tensile strength from polypivalolactone in a high efficiency. On the other hand, according to the method of producing the synthetic filament of the present invention, filaments having a high tensile strength can be produced from polypivalolactone relatively easily and very effectively. The synthetic filament of the present invention can be spun and drawn substantially as easily as conventional polyamide or polyester filament, and further it is considerably superior to the polyamide or polyester filament in the elastic property.

The second aspect of the synthetic filament according to the present invention lies in that the filament has a multilayer configuration. The term "multilayer configuration" herein used means one in which the main portion consists of a plurality of substantially continuous layers. A composite filament having a cross-section as shown in FIG. 1 is called a two-layer filament. FIG. 2 is a cross-section of a four-layer filament. Filaments having a multilayer configuration, for example, multilayer filaments, can be obtained by layer-multiplying at least two spinning materials and then spinning the layer-multiplied spinning materials. The inventors have already proposed spinnerets and methods for spinning multilayer filaments in the copending U.S. patent application Ser. No. 711,070 filed on Mar. 6, 1968 now abandoned and No. 783,508 filed on Dec. 13, 1968 now Pat. No. 3,613,173. The spinnerets disclosed in the above patent applications have a layer-multiplying mixer. The layer multiplying mixers are classified into two kinds, one of which comprises multistage reservoirs and narrow passages connecting the reservoirs (U.S. patent application Ser. No. 711,070), and another of which comprises a three-dimensional network of narrow passages (U.S. patent application Ser. No. 783,508), and both of which can be used for the purpose of the present invention.

Figure 14:
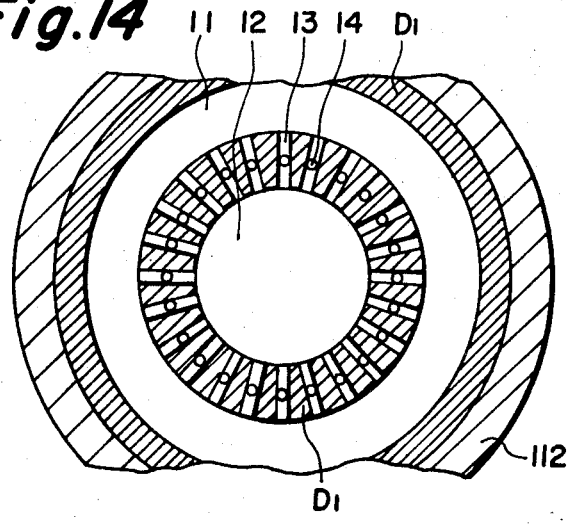
Figure 15:
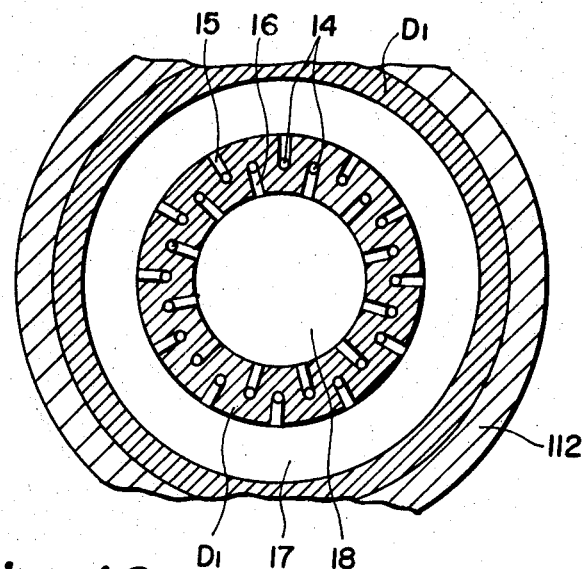
Figure 16:
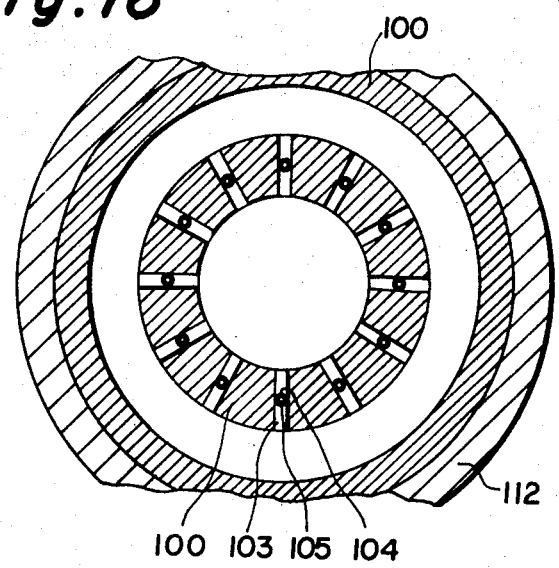
Figure 17:
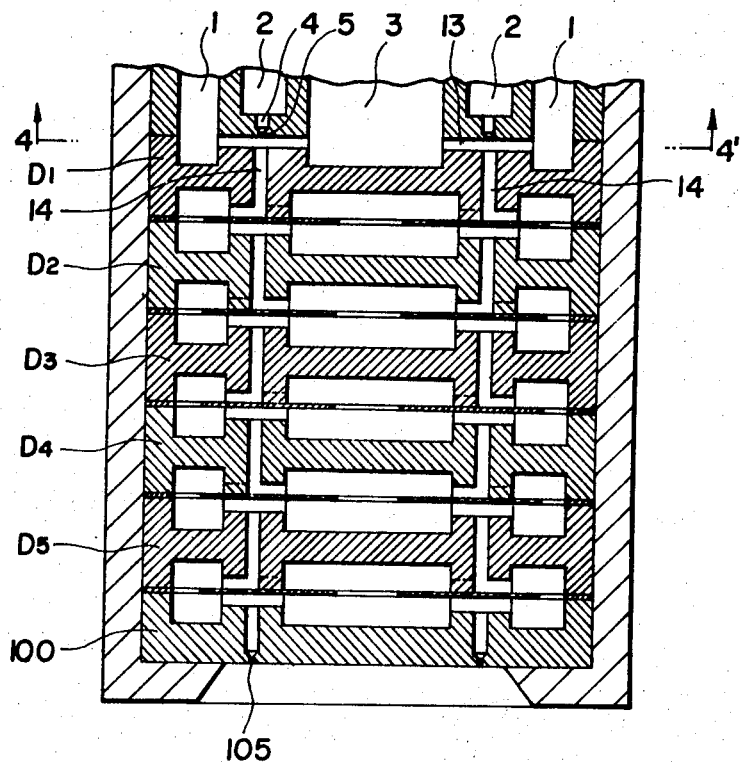
Figure 18:
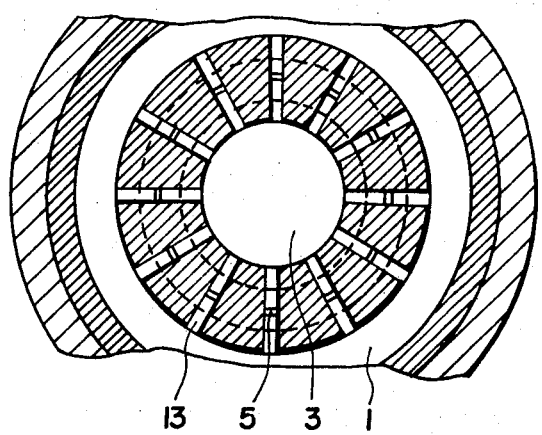
Figure 19:
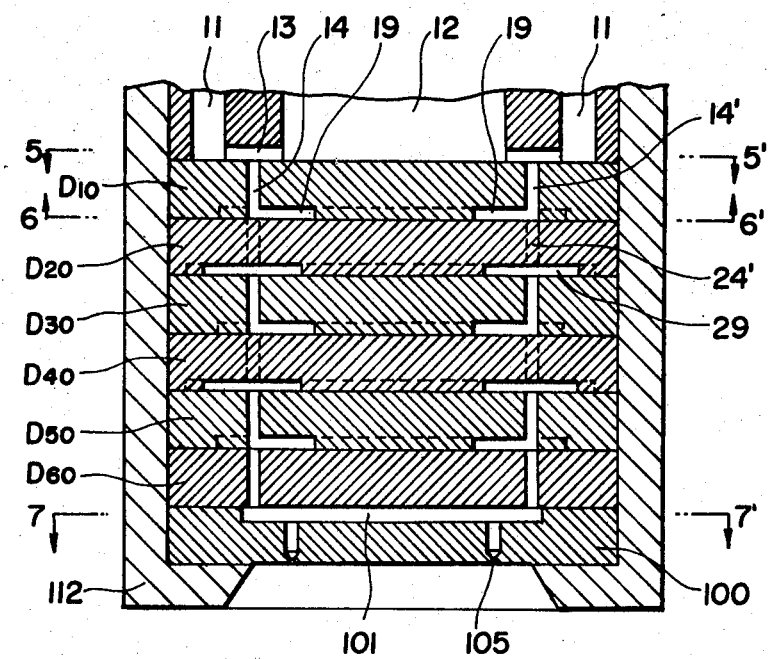
Figure 20:
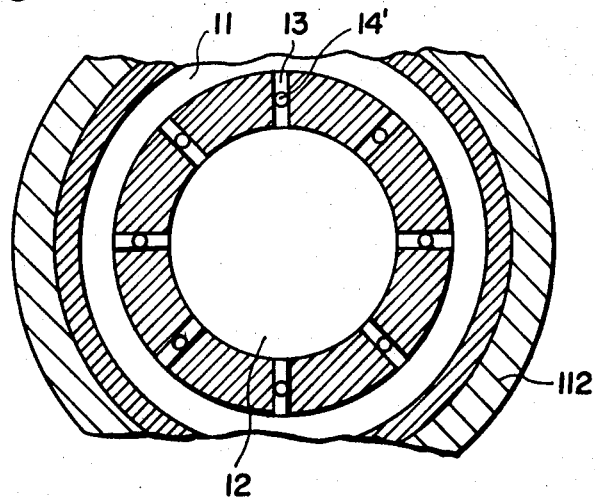
Figure 21:
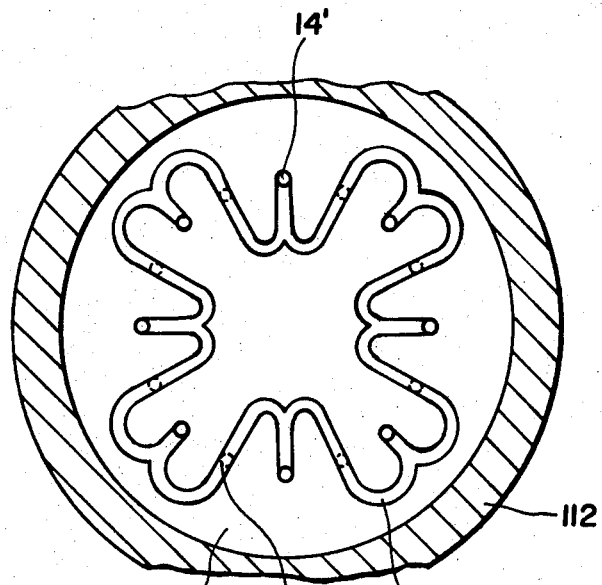
Figure 22:
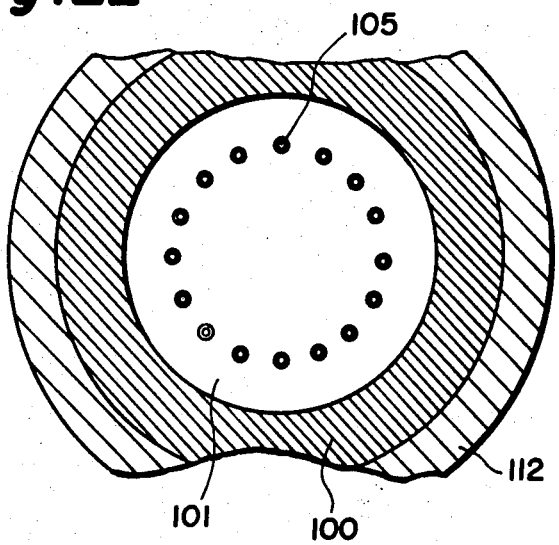
Figure 23:

For a better understanding of the invention, reference is taken to the accompanying drawings, wherein:
FIG. 1 is a cross-sectional view of a two-layer filament;
FIG. 2 is a cross-sectional view of a four-layer filament;
FIGS. 3–9 are cross-sectional views of multilayer filaments according to the present invention, respectively;
FIGS. 10–12 are model diagrams for illustrating a basic method of layer-multiplying spinning materials into multilayers, respectively;
FIG. 13 is a vertical sectional view of a spinneret provided with a reservoir type layer-multiplying mixer;
FIGS. 14, 15 and 16 are cross-sectional views of the spinneret shown in FIG. 13 taken on lines 1–1', 2–2' and 3–3' in the arrow direction, respectively;
FIG. 17 is a vertical sectional view of another spinneret provided with a reservoir type layer-multiplying mixer;
FIG. 18 is a cross-sectional view of the spinneret shown in FIG. 17 taken on a line 4–4' in the arrow direction;

FIG. 19 is a vertical sectional view of a spinneret provided with a network-of-passage type layer-multiplying mixer;

FIGS. 20, 21 and 22 are cross-sectional views of the spinneret shown in FIG. 19 taken on lines 5–5', 6–6' and 7–7' in the arrow direction, respectively; and FIG. 23 is a photomicrograph of a cross-section of a synthetic filament according to the present invention.

FIG. 10 is a model diagram of a fundamental type for showing the process of layer-multiplying the spinning materials in the above-mentioned layer-multiplying mixer.

Referring to FIG. 10, two spinning materials (a) and (b) are jointed at a point ($J_1$) to form two-layer structure (ab), which is divided at a point (S) and then again jointed at a point ($J_2$) to form four-layer structure (abab). The cross-section of the two-layer structure obtained at the point ($J_1$) is, for example, as shown in FIG. 1 and the four-layer structure obtained at the point ($J_2$), for example, as shown in FIG. 2. When such joining and dividing as shown in FIG. 10 are repeated $n$ times in a multistage operation, the number of the obtained layers is calculated to be $2^n$. The feature of such joining and dividing is that the dividing at the point (S) is carried out, while maintaining the joined state at the point ($J_1$) at least in part, preferably in whole, and that the joining at the point ($J_2$) is carried out so as to add the number of layers at least in part, preferably, in whole. Such joining and dividing are called "joining-dividing in different phase," because the phases (directions) of joining and dividing are different. It is most preferable that the directions of joining and dividing are different and are at right angles to each other.

FIG. 10 illustrates a fundamental type of the joining and dividing in different phases and there are many modifications and applications thereof (combinations of fundamental types). FIG. 11 is an embodiment of its application, in which the joining ($J_1$) of three components (a), (b) and (c) in a side-by-side relation is carried out in the first stage and the number of the obtained layers is calculated to be $3 \times 2^{n-1}$ ($n$: number of stages for joining and dividing). FIG. 12 is also one embodiment of the application of FIG. 10, in which at the point (S) the flow is divided into three and the number of the obtained layers is calculated to be $2 \times 3^{n-1}$. Of course, these calculated values are ones when the joining and dividing are carried out in completely different phase. In a practical spinneret, the number of layers may be different from the above calculated value owing to the irregularity and interruption of flow of the spinning materials.

When the above-mentioned joining-dividing in different phases is applied to a combination of two spinning materials, such as polyamide/polypivalolactone or polyester/polypivalolactone, or a combination of three spinning materials, such as polyamide/polyester/polypivalolactone, the resulting mixed configuration varies depending upon the combination of the polymers, the number ($n$) of stages of joining-dividing, and the structure of the layer-multiplying mixer.

The inventors have classified the multilayer configuration obtained by the joining-dividing in different phase into three kinds, that is, grainy, archipelagic and nebula-like configurations corresponding to the configuration of the cross-section. The term "grainy configuration" means a configuration in which a multiplicity of thin layers having similar thicknesses are arranged in grainy or layered state. FIG. 3 shows an embodiment of the grainy configuration.

The term "archipelagic configuration" means a configuration in which the grainy layers are interrupted irregularly, so that the cross-section has the appearance of a large number of large and small islands scattered in an ocean. FIG. 4 shows an embodiment of the archipelagic configuration.

The term "nebula-like configuration" means a configuration in which the number of islands is relatively larger than that of the archipelagic configuration, the shapes of the islands are generally circular and/or elliptical, so that the cross section has the appearance of a large number of stars dispersed in the sky. FIG. 5 shows an embodiment of the nebula-like configuration.

Filaments having a double structure, wherein an island or star of one component located in an island or star of the other component, may be often formed.

Of course, the above-mentioned grainy, archipelagic and nebula-like configurations appear only in the cross-section of the filament, and the main layers are substantially continuous along the longitudinal direction of the filament. That is, the length of the main layer is sufficiently long. In the continuous filament, each main layer other than the layers of very fine islands and stars has a length of at least several centimeters, usually at least several meters.

In general, when a combination of spinning materials having a high mutual affinity is subjected to a multistage joining-dividing in different phase, a grainy configuration can be easily obtained. For example, a combination of nylon-6/nylon-66 often provides a grainy configuration independently of the number ($n$) of stages of joining-dividing. Generally speaking, an archipelagic or nebula-like configuration can be easily obtained by means of a reservoir type layer-multiplying mixer, and a grainy configuration can be easily obtained by means of a network-of-passage type layer-multiplying mixer. In a combination of spinning materials having a poor mutual affinity, such as polyamide/polyethylene terephthalate, when the number ($n$) of stages of joining-dividing is small, a grainy configuration is formed, and as the number ($n$) of stages increases, an archipelagic configuration is firstly formed, and as the number ($n$) of stages further increases, a nebula-like configuration is formed. In a combination of polyamide/polypivalolactone, a grainy configuration or a grain-like archipelagic configuration is often formed. In a combination of polyester/polypivalolactone or polyamide/polyester/polypivalolactone, as the number ($n$) of stages increases, the resulting multilayer configuration varies from grainy to archipelagic and further to nebula-like configuration. It is of interest that polypivalolactone, although it is a type of polyesters, has an affinity to polyamide higher than that of polyesters other than polypivalolactone.

One of the important features of the multi-layer configuration is that the components are mixed in a very finely divided state, and the contacting area between the components is large, and consequently the components are bonded strongly. It will be apparent that in the grainy configuration or the grain-like mixed configuration, the contacting area between the components is very large. In the nebula-like configuration, since one component is surrounded by the other component, fibrillation due to separation between the components scarcely occurs, even when the components have a poor mutual adhesivity. Accordingly, when a grainy configuration or a grain-like archipelagic configuration is formed, for example, by a combination of polyamide/polypivalolactone, separation between the components scarcely occurs. While, even in a combination of polyester/polypivalolactone or polyamide/polyester/polypivalolactone, as the multi-layer configuration varies from archipelagic configuration to nebula-like configuration, separation between the components and fibrillation decrease. It is desirable to increase the number of layers in order to strengthen the bonding between the components. For this purpose, for example, the number of layers is preferred to be at least 8, more preferably at least 10, most preferably at least 30. Accordingly, the number ($n$) of stages of joining-dividing in different phase should be at least 3, more preferably at least 4, most preferably at least 5. In order to obtain a nebula-like configuration, the number ($n$) of stages is preferred to be at least 8, more preferably at least 10.

The polypivalolactone to be used in the present invention includes polymers containing at least 60% by weight, preferably at least 80% by weight, of polypivalolactone as a main component. These polymers may contain a small amount of additives, such as stabilizer, pigment and plasticizer, and also these polymers may be copolymers.

The stabilizer includes radical scavengers, such as octadecyl phosphite, etc., and conventional anti-oxidants, such as copper and manganese compounds and phosphorous acid compounds, etc.

The plasticizer includes paraffin, polyolefin, modified polyolefin and polyalkylene oxide, etc.

The comonomer to be copolymerized includes $\alpha,\alpha'$-$R_1R_2$-$\beta$-propiolactone, wherein $R_1$ and $R_2$ represent methyl, ethyl, propyl and phenyl groups and the like.

The polyester to be used in the present invention includes commonly known fiber-forming polyesters excluding polypivalolactone. For example, mention may be made of polyethylene terephthalate, polytetramethylene terephthalate, polyethylene oxybenzoate, poly-bis-methylcyclohexane terephthalate and copolymers thereof, such as polyethylene terephthalate/isophthalate, polyethylene terephthalate/oxybenzoate, polyethylene terephthalate/hexahydroterephthalate, and polymer blends and modified polymers thereof.

The polyamide to be used in the present invention includes commonly known fiber-forming polyamides. For example, mention may be made of nylon-6, nylon-7, nylon-11, nylon-12, nylon-66, nylon-610, polymetaxylyleneadipamide (MXD-6), polyparaxylylene dodecanamide (PXD-12), poly-para-bis-methylcyclohexylmethyl dodecanamide (PACM-12) and copolymers thereof, such as nylon - 6/nylon - 66, nylon - 66/polyhexamethyleneterephthalamide (6T), nylon - 66/polyhexamethyleneisophthalamide (6I), nylon-6/6T, nylon-6/6I, and modified polymers and polymer blends thereof.

In a synthetic filament according to the present invention, the mixing ratio of each component for constituting the multilayer configuration composed of (1) polypivalolactone and (2) polyamide and/or polyester can be selected optionally depending upon the purpose. However, when the mixing amount (percent by weight in the multilayer configuration portion) of polypivalolactone is too low, the elastic property of the filament cannot be improved, while when the mixing amount is too high, the production of the above-mentioned synthetic filament is difficult. Accordingly, the mixing amount of polypivalolactone is preferred to be 10–75% by weight, more preferably 25–60% by weight, most preferably 30–50% by weight. When the multilayer configuration portion is composed of three components of polyamide/polyester/polypivalolactone, the mixing ratio of polyamide to polyester can be selected optionally, but the mixing ratio is usually 4/1–1/4 (weight ratio), preferably 2/1–1/2.

The synthetic filament according to the present invention has a multilayer configuration composed of (1) polypivalolactone and (2) polyamide and/or polyester at least in a part of the cross-section. It is not always necessary that the entire cross-section consist of the above-mentioned multilayer configuration, but even if a part of the cross-section has the multilayer configuration, while the other part has no multilayer configuration, the object of the present invention can be attained. Such a bonding structure can be obtained by applying the bonding method used in the production of conventional composite filaments. FIGS. 6–8 are cross-sectional views of synthetic filaments according to the present invention having a multilayer configuration, for example, a grainy configuration, at least in a part of the cross-section. The component to be bonded to the multilayer configuration portion may be a component having a single-layer configuration or a component having a multilayer configuration. This component includes commonly known fiber-forming materials capable of melt spinning, such as polyamide, polyester and polyolefin. Particularly, polyamide and polyester are preferable in view of their conjugated spinnability.

Embodiments of producing the synthetic filaments according to the present invention will be explained with reference to drawings.

FIG. 13 is a vertical sectional view of a spinneret provided with a reservoir type layer-multiplying mixer. The spinneret shown in FIG. 13 is provided with successively superposed four distributing plates $D_1$, $D_2$, $D_3$ and $D_4$ between supplying portions 11 and 12 and a spinneret plate 100 having orifices 105. In this spinneret, 5 times ($n=5$) of joining-dividing are effected.

Two spinning materials are fed to the reservoirs 11 and 12 in a predetermined mixing ratio by means of metering pumps, respectively. The two spinning materials in the reservoirs 11 and 12 are joined at the middle portion of ducts 13, and a part of the joined spinning materials flows into an outer reservoir 17 through vertical conduits 14 and distributing passages 15 while maintaining the joined state, and another part of the joined spinning materials flows into an inner reservoir 18 through vertical conduits 14 and distributing passages 16 while maintaining the joined state. The reservoir 17 communicates to the second stage outer reservoir 21, and the reservoir 18 communicates to the second stage inner reservoir 22. The spinning materials in the reservoirs 21 and 22 are again joined at the middle portion of ducts 23. In the same manner, the spinning materials are repeatedly subjected to joining-dividing, and finally joined at the middle portion of ducts 103 and then extruded from orifices 105 through vertical conduits 104. In FIG. 13, the arrow shows direction of spinning material flow. The numeral 111 shows a partition plate, which also serves as a gasket, and the numeral 112 shows a holder.

FIG. 14 is a cross-sectional view of the spinneret shown in FIG. 13 taken on a line 1–1' in the arrow direction, and shows the arrangement of the reservoirs 11 and 12, the ducts 13 and the vertical conduits 14. FIG. 15 is a cross-sectional view of the spinneret shown in FIG. 13 taken on a line 2–2' in the arrow direction, and shows the arrangement of the vertical conduits 14, the distributing passages 15 and 16 and the reservoirs 17 and 18. FIG. 16 is a cross-sectional view of the spinneret shown in FIG. 13 taken on a line 3–3' in the arrow direction, and shows the arrangement of the orifices 105. The number of orifices 105 may be same as or different from that of vertical conduits 14. The cross-sectional shape of the orifice 105 may be circular or non-circular. FIG. 9 shows a cross-sectional shape of filaments having a non-circular cross-section extruded through orifices having a Y-shaped cross-section.

The spinneret shown in FIG. 13 is used for layer-multiplying two components. A spinneret to be used for spinning three components will be explained with respect to FIG. 17. FIG. 17 shows an embodiment of spinnerets to be used for carrying out the method shown in FIG. 11. The spinneret shown in FIG. 17 is provided with successively superposed five distributing plates $D_1$, $D_2$, $D_3$, $D_4$ and $D_5$ between spinning material supplying portions 1, 2 and 3 and a spinneret plate 100 having orifices 105. In this spinneret, 6 times of joining-dividing are effected.

Three spinning materials are fed to the supplying portions 1, 2 and 3 in a predetermined mixing ratio by means of metering pumps, respectively. Two spinning materials in the supplying portions 1 and 3 flow into ducts 13 from their both ends, respectively, while another spinning material in the supplying portion 2 flows down through vertical holes 4. The three spinning materials are joined just above the inlets of vertical conduits 14 and flow into the vertical conduits 14. Then, the joined three spinning materials are repeatedly subjected to joining-dividing in the same manner as described in the spinneret shown in FIG. 13, and the resulting layer-multiplied spinning materials are extruded through orifices 105 on a spinneret plate 100. The shape of the opening 5 at the lower end of the vertical hole 4 may be selected optionally, but a rectangular (slit-shaped) opening is often preferable in order to effect layer-multiplying effectively.

FIG. 18 is a cross-sectional view of the spinneret shown in FIG. 17 taken on a line 4–4' in the arrow direction, and shows the relation between the ducts 13 and the openings 5 at the lower end of the vertical holes 4.

Furthermore, a network-of-passage type layer-multiplying mixer is remarkably suitable for the purpose of the present invention. Particularly, this type mixer is suitable for spinning materials which decompose readily, because the residence time of spinning materials in the mixer is short. Moreover, the network-of-passage type layer-multiplying mixer is suitable for producing filaments having a grainy cross-sectional configuration. When this type mixer is used, grainy configuration can be easily obtained from a combination of polypivalolactone/polyester.

An embodiment of spinnerets provided with a network-of-passage type layer-multiplying mixer is shown in FIGS. 19–22.

FIG. 19 is a vertical sectional view of the above described spinneret. Two spinning materials are fed to reservoirs 11 and 12 in a predetermined mixing ratio. The two spinning materials in the reservoirs 11 and 12 are joined at the middle portion of ducts 13, passed through vertical conduits 14' of a distributing plate $D_{10}$, and then subjected to joining-dividing in different phase in dividing-joining passages 19 arranged at the bottom surface of the distributing plate $D_{10}$, and flowed into vertical conduits 24' of the 2nd stage distributing plate $D_{20}$. In the same manner, the spinning materials are repeatedly subjected to 6 times in total of the joining-dividing, and the layer-multiplied spinning materials are flowed into a reservoir 101 and then extruded through orifices 105 on a spinneret plate 100. The numeral 112 shows a holder.

FIG. 20 is a cross-sectional view of the spinneret shown in FIG. 19 taken on a line 5–5' in the arrow direction, and shows the arrangement of the reservoirs 11 and 21, the ducts 13 and the vertical conduits 14'. FIG. 21 is a cross-sectional view of the spinneret shown in FIG. 19 taken on a line 6–6' in the arrow direction, and shows the arrangement of the dividing-joining passage 19 arranged at the bottom surface of the distributing plate $D_{10}$ and the vertical conduits 14'. In FIG. 21, the connecting points of the vertical conduits 24' of the 2nd stage distributing plate 20 and the dividing-joining passages 19 of the 1st stage distributing plate $D_{10}$ are shown by the dotted line circles 24'. FIG. 22 is a cross-sectional view of the spinneret shown in FIG. 19 taken on a line 7–7' in the arrow direction and shows that the orifices 105 are arranged on a common circumference.

The synthetic filament according to the present invention is very excellent in its dynamic property. Conventional mixed filaments, for example, filaments obtained by mixing pellets of two polymers, and then melting, mixing and spinning the mixed pellets by means of an extruder are generally poor in tensile strength and in recovery from elongation. This is based on the fact that one component is dispersed in the other component in the form of granules or needles, and consequently the mixed configuration is essentially discontinuous along the longitudinal direction of the filament.

On the contrary, the synthetic filament of the present invention has an essentially continuous structure and has an improved tensile strength and recovery from elongation. The filament of the present invention has a particularly high recovery from elongation and energy elasticity, and is suitable to be used for cloths and industrial materials. This execllent recovery from elongation and energy elasticity is substantially due to the polypivalolactone, but filaments, in which polypivalolactone and polyamide and/or polyester are mixed in a granular or needle-like state, do not have these excellent properties.

In the synthetic filament according to the present invention, the components are mutually mixed very finely, and therefore the components do not separate and fibrillation of filament resulting from the separation does not occur, and consequently there are few difficulties (for example, yarn breakage in the drawing step) in the commercial production. It has been found that there are particularly few separations between components in a combination of polypivalolactone/polyamide. It is not clear why polypivaloloactone has an unexpectively high affinity to polyamides, such as nylon-6 and nylon-66, but amines used as a polymerization initiator in the production of polypivalolactone may contribute to this affinity. In this case, the amino groups are probably present at the terminal ends of the polypivalolactone. In a combination of polypivalolactone and polyester, fibrillation can be prevented by increasing the number of layers in the grainy configuration and decreasing the average thickness of the layers, or by forming nebula-like configuration.

The structure of the synthetic filament according to the present invention may be of such a structure that the multilayer configuration portion composed of (1) polyamide and/or polyester excluding polypivalolactone and (2) polypivalolactone occupies at least a part of the filament surface. In this case, each component constituting the multilayer configuration can occupy a part of the filament surface.

One of the merits of such a structure lies in that filaments having a pleasant touch and gloss can be obtained. Particularly, the excellent touch and gloss can be remarkably improved by treating the synthetic filament according to the invention or fibrous articles made of the filaments, such as knitted goods and woven fabrics, with an alkali to hydrolyze some and to remove at least a part of the polypivalolactone and/or polyester. Conversely, when a part of the polyamide is dissolved and removed in proper solvents, such as formic acid and hot acetic acid, the same effect can be attained.

Another merit of the structure in which each component occupies a part of the filament surface lies in the improvement of the frictional charge. It has been well known that polyamide is charged positively by friction in most cases, while polyester is charged negatively by friction. Polypivalolactone is charged positively in most cases, but is sometimes charged negatively. This is probably due to the terminal amino group, but the reason is not clear. In any case, by a combination of polymers having a positive charging tendency and polymers having a negative charging tendency (the polarity of charge can be easily determined), for example, polyamide/polyester/polypivalolactone, or polyester/polypivalolactone (in this case, polypivalolactone having a positive charging tendency is used), the charges of the resulting filament are neutralized, and consequently the charged voltage of the filament due to friction can be actually decreased. The electricity of the filament can be fairly suppressed by mixing a compound having a high electric conductivity, for example, polyethylene oxide or derivatives thereof, into the component polymers, and moreover, when a compound having a high electric conductivity is mixed with at least one component polymer constituting the multilayer configuration composed of polymers charging in reverse polarity, a very high antistatic effect can be attained. The reason probably is that the charges are rapidly neutralized through the conductive compound. As described above, in the filament according to the invention, the frictional charge can be fairly suppressed by a proper selection of components, i.e., by a combination of components charging in reverse polarity. Moreover, a filament having a very low electricity can be obtained by mixing a small amount, for example, 1–30% by weight, preferably 1–10% by weight, of a highly conductive compound with at least one polymer of polyamide, polyester and polypivalolactone in granular, needle-like or multilayer state.

As already described, the synthetic filament according to the present invention can be produced very easily. Particularly, when polypivalolactone copolymer copolymerized with a small amount (1–10% by weight) of a comonomer or a modified polypivalolactone blended with a small amount (0.5–5% by weight) of a plasticizer is used, the spinning and drawing are very easy. Of course, even when unmodified polypivalolactone is used, an excellent synthetic filament can be obtained relatively easily according to the method of the present invention. However, it is fairly difficult when polypivalolactone alone is spun and drawn to produce filaments.

Moreover, the filament according to the present invention has the remarkable characteristic that the polypivalolactone in the filament can be made into an elastomer by a heat treatment. Polypivalolactone can be made into elastomer by heating, for example, at 180° C. for 30 minutes, and in the filament according to the present invention also, excellent elasticity, particularly, high recovery from elongation can be obtained by heat treatment. Even when a heat treatment is not effected, the filament of the present invention has a recovery from elongation fairly higher than a polyamide or polyester filament, but when a heat treatment is effected, the recovery from elongation can be remarkably increased. This heat treatment may be effected with respect to undrawn filaments, drawn filaments, knitted goods or woven fabrics. Sometimes, the filament may naturally be converted to an elastic filament by heating in the dyeing or finishing step or during use without any special heat treatment. For example, when the filament of the present invention is used as a tirecord, the temperature of the tire fairly increases during running, so that the elasticity, particularly the energy elasticity of the filament increases during use. When polypivalolactone copolymer or modified polypivalolactone blended with a plasticizer is used, the effect of the heat treatment appears at a low temperature and in a short time more remarkably than in the case when unmodified polypivalolactone is used. When the filament of the present invention is subjected to a heat treatment or is used at a relatively high temperature, it is preferably to add commonly known antioxidants to each component, particularly to the polyamide. For example, phosphoric acid series, phosphorous acid series, copper series, manganese series and organic nitrogen compound series antioxidants can be mixed with polyamide, polyester and/or polypivalolactone constituting the filament of the present invention in a conventional manner.

The following examples are given in illustration of this invention and are not intended as limitations thereof. In the examples, "part" means by weight.

EXAMPLE 1

Nylon-6 having an intrinsic viscosity of 1.16 in m-cresol at 30° C. and polypivalolactone (hereinafter abridged as PPL) having an intrinsic viscosity of 2.5 in an o-chlorophenol/phenol (weight ratio=4/6) mixed solution were mix spun by means of a spinneret as shown in FIG. 13, which was provided with 4 distributing plates (that is, the number $n$ of stages of joining-dividing is 5). The spinneret was kept at a temperature of 290° C.

50 parts of the melted nylon-6 were fed to a supplying portion 1 and 50 parts of the melted PPL were fed to a supplying portion 2 by means of gear pumps while metering respectively, and the two spinning materials were layer-multiplied in the spinneret, extruded through orifices 105 having a diameter of 0.25 mm. into air, cooled and wound up on a bobbin after oiling. The wound undrawn filaments were drawn to 3.4 times their original length on a draw pin at 130° C. to obtain filaments $Y_1$ of 70 d./18 f.

A photomicrograph of a cross-section of the filament $Y_1$ was shown in FIG. 23. The cross-section had a grain-like archipelagic configuration. In FIG. 23, the dark portion is nylon-6.

For comparison, 50 parts of pellets of the above nylon-6 and 50 parts of pellets of the above PPL were thoroughly mixed, and the resulting mixture was melted and extruded through orifices on a spinneret plate kept at 290° C. in a conventional melt spinning process by means of a screw extruder. The extruded filaments were wound up and drawn in the same manner as described in the case of the filaments $Y_1$ to obtain filaments $Y_2$ of 70 d./18 f.

Further, the nylon-6 was melted and spun in a conventional manner, and the spun filaments were drawn at room temperature to obtain filaments $Y_3$.

The tensile strength, elongation and recovery for fatigue of the filaments $Y_1$, $Y_2$ and $Y_3$ were determined to obtain a result as shown in the following Table 1.

TABLE 1

| Filament | Tensile strength (g./d.) | Elongation (percent) | Recovery for fatigue (percent) |
|---|---|---|---|
| Filament $Y_1$ (present invention) | 4.1 | 38 | 80.0 |
| Filament $Y_2$ (control) | 2.5 | 35 | 63.0 |
| Filament $Y_3$ (control) | 5.1 | 34 | 73.0 |

The term "recovery for fatigue" means recovery ratio when a sample filament is elongated 20% and then the elongation is recovered and such a process is repeated 10 times.

As seen from Table 1, the filament $Y_1$ according to the present invention is superior in the dynamic property to the filament $Y_2$ prepared by granular mixing spinning process. The filament $Y_3$ had a monotonous gloss, but the filaments $Y_1$ and $Y_2$ had an agreeable delustered gloss.

EXAMPLE 2

Polyethylene terephthalate (hereinafter abridged as PET) having an intrinsic viscosity of 0.67 in o-chlorophenol at 30° C. and PPL having an intrinsic viscosity of 2.53 in an o-chlorophenol/phenol (weight ratio=4/6) mixed solution at 30° C. and prepared by the use of tributylamine as a polymerization initiator were mix spun by means of a spinneret as shown in FIG. 13, which was provided with 11 distributing plates ($n$=12). The spinneret was kept at a temperature of 290° C.

The melted PET was fed to a supplying portion 1 and the melted PPL was fed to a supplying portion 2 by means of gear pumps while metering, and the two spinning materials were layer-multiplied in the spinneret, extruded through orifices 105 having a diameter of 0.2 mm. into air, cooled and wound up on a bobbin after oiling. The wound undrawn filaments were drawn to 3.5 times their original length on a draw pin at 150° C. and further heat-set on a hot plate at 170° C. to obtain filaments of 75 d./36 f. The resulting filament had a nebula-like cross-sectional configuration as shown in FIG. 5, and the PPL formed stars. When the mixing ratio of PET/PPL was 1/1, 2/1 and 3/1 in weight ratio, the resulting filaments were referred to as filaments $Y_4$, $Y_5$ and $Y_6$, respectively.

For comparison, the PET was melt and spun, and the spun filaments were drawn and heat-set in the same manner as described above to obtain filaments $Y_7$.

The tensile strength, elongation and recovery for fatigue of the filaments $Y_4$–$Y_7$ were determined in the same manner as described in Example 1 to obtain a result as shown in the following Table 2.

TABLE 2

| Filament | Tensile strength (g./d.) | Elongation (percent) | Recovery for fatigue (percent) |
|---|---|---|---|
| Filament $Y_4$ (present invention) | 3.75 | 37 | 78 |
| Filament $Y_5$ (present invention) | 3.8 | 35 | 75.5 |
| Filament $Y_6$ (present invention) | 3.95 | 32.5 | 73 |
| Filament $Y_7$ (control) | 4.5 | 28 | 41 |

As seen from Table 2, the filaments $Y_4$, $Y_5$ and $Y_6$ according to the present invention were considerably superior to the control filament $Y_7$ in the recovery for fatigue.

Then, the charge voltages due to friction of the filaments $Y_4$–$Y_7$ were determined to obtain the results as shown in the following Table 3. In the determination of the charged voltage due to friction, the filaments not subjected to oiling in the spinning were used.

TABLE 3

| Filament: | Charged voltage (v.) |
|---|---|
| Filament $Y_4$ | −200 |
| Filament $Y_5$ | −450 |
| Filament $Y_6$ | −750 |
| Filament $Y_7$ | −1700 |

The charged voltage due to friction of filament was determined in the following manner.

The previously discharged filament is run at a velocity of 200 m./min. and contacted with alumina ceramic having a diameter of 10 mm. of four times at an angle of 90° (in total 360°) and then passed through a detector of static electricity. The detecting method is a vibration capacity process and the filament does not contact with the detector.

As seen from Table 3, the filaments $Y_4$–$Y_6$ according to the present invention are excellent in the antistatic property.

EXAMPLE 3

Nylon-6 containing 50 p.p.m. (by weight) of copper acetate as an antioxidant and 50 p.p.m. (by weight) of potassium iodide as a promotor for the antioxidant and having an intrinsic viscosity of 1.1 in m-cresol at 30° C. and a modified PPL composed of PPL having an intrinsic viscosity of 2.55 in an o-chlorophenol/phenol (weight ratio=4/6) mixed solution and 5% by weight of polyethylene having a molecular weight of 10,000 based on the PPL were mix spun in a mixing ratio of 1/1 (weight ratio) by means of a spinneret as shown in FIG. 13, which was provided with 8 distributing plates ($n$=9). The spinneret was kept at a temperature of 280° C. The two spinning materials were mix spun in substantially the same manner as described in Example 1, and the spun filaments were drawn to 3.55 times their original length on a draw pin at 110° C. to obtain filaments $Y_8$ of 110 d./28 f.

Then, nylon-66 having an intrinsic viscosity of 1.16 in m-cresol at 30° C. and a copolymer of 80 parts of pivalolactone and 20 parts of $\alpha,\alpha'$-diethyl-$\beta$-propiolactone, which has an intrinsic viscosity of 2.49 in an o-chlorophenol/phenol (weight ratio=4/6) mixed solution were mix spun in a mixing ratio of 1/1 (weight ratio) and drawn in substantially the same manner as described in the case of the filaments $Y_8$, except that the spun filaments were drawn to 3.4 times their original length, to obtain filaments $Y_9$ of 110 d./28 f.

For comparison, nylon-66 was spun and drawn in a conventional manner to obtain filaments $Y_{10}$ of 110 d./28 f.

The filaments $Y_8$ and $Y_9$ and the filaments $Y_1$ obtained in Example 1 were heat treated at 170° C. for 30 minutes in a relaxed state and in a dry state to obtain filaments $Y_8'$, $Y_9'$ and $Y_1'$, respectively.

The recoveries for fatigue of the filaments $Y_8'$, $Y_9'$, $Y_1'$ and $Y_{10}$ were determined in the same manner as described in Example 1 to obtain values of 87%, 85%, 83% and 72%, respectively.

The filament $Y_9$, in which the PPL copolymer was used, and the filament $Y_8$, in which the modified PPL blended with polyethylene as a plasticizer was used, are more easy in spinning and drawing than the filament $Y_1$, in which unmodified PPL was used. Moreover, in the filaments $Y_9$ and $Y_8$, the elastic property can be improved more rapidly and strongly by heat treatment. However, in any case, the elasticity (recovery for elongation) of the filaments having a multi-layer configuration, in which PPL is contained as one component, can be remarkably improved by heat treatment.

EXAMPLE 4

The nylon-6 and PPL used in Example 1 and the PET used in Example 2 were mix spun by means of a spinneret as shown in FIG. 17. The nylon-6, PPL and PET were fed to supplying portions in a ratio of nylon-6/PPL/PET=1/1/1 (weight ratio), layer-multiplied during passing through 10 distributing plates, and extruded through orifices on the spinneret plate kept at 290° C. The extruded filaments were wound up and drawn in the same manner as described in Example 1 to obtain filaments $Y_{11}$ of 100 d./28 f. The filament $Y_{11}$ had a complicated nebulous cross-sectional configuration.

A tricot $T_1$ was knitted from the filaments $Y_{11}$ and treated with 4% NaOH aqueous solution kept at 90° C. for 30 minutes to obtain a tricot $T_{11}$. The weight of the tricot $T_{11}$ was about 80% based on the weight of untreated tricot $T_1$.

Then, a blouse was prepared from the tricot $T_{11}$. The blouse has a natural fiber-like, particularly silk-like, touch and gloss. The blouse was able to be put on and taken off without unpleasant feeling due to static electricity, and was hardly crumpled, and therefore the blouse was popular with users.

EXAMPLE 5

The nylon-6 and PPL used in Example 1 where layer-multiplied, and flows of the layer-multiplied spinning materials and flows of nylon-6 alone were bonded to prepare filaments having an eccentric sheath-core cross-section. That is, the nylon-6 and PPL were repeatedly subjected to 12 times of joining-dividing in a mixing ratio of 1/1 (weight ratio) in a spinneret kept at 290° C., and then flows of the resulting layer-multiplied spinning materials and flows of nylon-6 alone were bonded in a sheath-core relation (core/sheath=1/2) so that the nylon-6 formed a core, and extruded through orifices. The extruded filaments were wound up and drawn in the same manner as described in Example 1 to obtain filaments $Y_{12}$ of 45 d./7 f. The filament $Y_{12}$ was formed into a skein, and the skein was dipped into boiling water for 15 minutes, and then dried in air.

By this treatment, the filament $Y_{11}$ developed crimps and a very bulky filament was obtained.

EXAMPLE 6

The nylon-6 and PPL used in Example 3 were mix spun by means of a spinneret as shown in FIG. 19. That is, 40 parts of the nylon-6 and 60 parts of the PPL were fed to reservoirs 1 and 2 while metering respectively, layer-multiplied in a mixer provided with 6 network-of-passage type distributing plates $D_{10}$, $D_{20}$, $D_{30}$, $D_{40}$, $D_{50}$ and $D_{60}$ (the number $n$ of stages is 6), extruded through orifices 105 on a spinneret plate 100 kept at 290° C., cooled in air, and wound up on a bobbin after oiling. The wound undrawn filaments were drawn to 3.2 times their original length on a draw pin at 150° C. to obtain filaments $Y_{13}$. The filament $Y_{13}$ had a grainy cross-sectional configuration as shown in FIG. 3. However, the layers were somewhat distorted, and the number of layers was about 50.

When reservoir type distributing plates as shown in FIG. 13 were used and the nylon-6 and PPL were layer-multiplied by repeating 6 times of joining-divising ($n$=6), the resulting filament had an archipelagic cross-sectional configuration, while when network-of-passage type distributing plates were used, the resulting filament had a grainy cross-sectional configuration as described above. Therefore, the cross-sectional configuration of filament can be freely varied by a proper selection of the kind of distributing plate.

Then, the above described PPL was melted and spun in a conventional manner, and the spun filaments were wound up and drawn in the same manner as described in the case of the filaments $Y_{13}$ to obtain filaments $Y_{14}$.

In the spinning of the filaments $Y_{13}$, no yarn breakage occurred during 10 hours, but in the spinning of the filaments $Y_{14}$, yarn breakage occurred 2 times during 10 hours. Moreover, in the drawing of the filaments $Y_{13}$, no yarn breakage occurred, but in the drawing of the filaments $Y_{13}$ yarn breakage occurred 4 times per 1 kg. of drawn filaments. Thus, filament of the modified PPL single component is difficult in spinning and drawing, but when the PPL and nylon-6 are layer-multiplied, the spinnability and drawability of the resulting filament can be remarkably improved.

What is claimed is:

1. A unitary synthetic filament having, in at least a part of its cross-section and extending along its length, a structure consisting essentially of two or three different mutually adhering polymer components existing as at least eight distinct intermixed segments therein with each segment consisting essentially of one of said polymer components and in which the respective segments extend for a substantial distance lengthwise of the filament, said structure having a cross-sectional appearance of (1) multiple layers to provide a grainy configuration, or (2) multiple islands dispersed in a sea to provide an archipelagic configuration, or (3) multiple stars dispersed in a sky to provide a nebula-like configuration;

one of said polymer components being polypivalolactone;

the remaining polymer component or components being selected from the group consisting of (a) polyamides, (b) polyesters different from polypivalolactone and (c) (i) polyamides and (ii) polyesters different from polypivalolactone, forming separate polymer components in the filament;

the amount of said one polymer component being from 10% to 75% by weight of the total polymer components.

2. The filament as claimed in claim 1, wherein the entirety of the cross-section of the filament has said structure.

3. The filament as claimed in claim 1, wherein one part of the cross-section of the filament has said structure and the remainder is a fiber-forming material.

4. The filament as claimed in claim 3, wherein said remainder is a single homogeneous polymer phase.

5. The filament as claimed in claim 3, wherein said remainder has a structure of a grainy, archipelagic or nebula-like configuration different from the structure of said one part.

6. The filament as claimed in claim 3, wherein said one part and said remainder are bonded in a sheat-core relation.

7. The filament as claimed in claim 6, wherein said remainder forms the core.

8. The filament as claimed in claim 3, wherein said one part and said remainder are bonded in a side-by-side relation.

9. The filament as claimed in claim 1, wherein at least a part of the external surface of the filament is occupied by each polymer component.

10. The filament as claimed in claim 1, wherein the polymer components consist of polyamide and polypivalolactone.

11. The filament as claimed in claim 1, wherein the polymer components consist of polyester different from polypivalolactone, and polypivalolactone.

12. The filament as claimed in claim 1, wherein the polymer components consist of polyamide, polyester different from polypivalolactone and polypivalolactone.

13. The filament as claimed in claim 1, wherein the mixing amount of said polypivololactone is 25%–60% by weight.

14. The filament as claimed in claim 1, wherein the mixing amount of said polypivalolactone is 30%–50% by weight.

15. The filament as claimed in claim 12, wherein the mixing ratio of said polyamide to said polyester is 4/1–1/4.

16. The filament as claimed in claim 12, wherein the mixing ratio of said polyamide to said polyester is 2/1–1/2.

17. The filament as claimed in clam 1, wherein said polypivalolactone is a polypivalolactone homopolymer.

18. The filament as claimed in claim 1, wherein said polypivalolactone is a polypivalolactone copolymer containing at least 60% by weight of polypivalolactone.

19. The filament as claimed in claim 1, wherein said polypivalolactone is a modified polypivalolactone.

20. A filament as claimed in claim 1, obtained by melting separately said polymer components, joining the molten polymer components by directing same toward each other in the same plane and then directing the joined polymer components in a direction perpendicular to said plane, dividing the joint polymer components into segments white maintaining the polymer components joined together, said joining and dividing being repeated at least three times.

References Cited

UNITED STATES PATENTS

| | | | |
|---|---|---|---|
| 3,577,308 | 5/1971 | Van Drunen et al. | 161—176 |
| 3,562,093 | 2/1971 | Griffiths et al. | 161—173 |
| 3,562,374 | 2/1971 | Okamoto et al. | 264—210 X |

FOREIGN PATENTS

| | | |
|---|---|---|
| 1,167,182 | 10/1969 | Great Britain. |
| 1,495,835 | 8/1967 | France. |
| 482,844 | 1/1970 | Switzerland. |

ROBERT F. BURNETT, Primary Examiner

R. O. LINKER, Jr., Assistant Examiner

U.S. Cl. X.R.

161—177; 264—171, DIG 29